United States Patent
Jin et al.

(10) Patent No.: US 7,768,657 B2
(45) Date of Patent: Aug. 3, 2010

(54) OPTICAL FLY HEIGHT MEASUREMENT

(75) Inventors: Xuhui Jin, Eden Prairie, MN (US);
Amit Itagi, Pittsburgh, PA (US);
William Albert Challener, Sewickley, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 230 days.

(21) Appl. No.: 11/834,772

(22) Filed: Aug. 7, 2007

(65) Prior Publication Data
US 2009/0040531 A1    Feb. 12, 2009

(51) Int. Cl.
*G01B 11/14*    (2006.01)
(52) U.S. Cl. ...................... 356/614; 356/622
(58) Field of Classification Search .............. 356/521, 356/507, 369, 243.3, 505, 601, 604, 612; 250/201.5; 369/47.38; 360/77.03
See application file for complete search history.

(56) References Cited

U.S. PATENT DOCUMENTS

| | | | |
|---|---|---|---|
| 4,593,368 A | * | 6/1986 | Fridge et al. ............... 356/507 |
| 5,946,281 A | * | 8/1999 | Ito et al. ............... 369/112.07 |
| 6,688,743 B1 | | 2/2004 | Durnin et al. |
| 7,057,719 B2 | | 6/2006 | Li et al. |
| 7,057,740 B2 | | 6/2006 | Hu et al. |
| 7,206,077 B2 | | 4/2007 | Nozu et al. |

* cited by examiner

*Primary Examiner*—Gregory J. Toatley, Jr.
*Assistant Examiner*—Tri T Ton
(74) *Attorney, Agent, or Firm*—Benjamin T. Queen, II; Pietragallo Gordon Alfano Bosick & Raspanti, LLP

(57) ABSTRACT

An optical fly height measurement system includes a planar waveguide, a first diffraction grating for coupling an electromagnetic wave into the planar waveguide wherein the first diffraction grating is positioned for directing the electromagnetic wave towards an air bearing surface of a slider. A second diffraction grating is provided for receiving the electromagnetic wave reflected from the air bearing surface. A detector module and processor are provided to determine the fly height.

10 Claims, 3 Drawing Sheets

OPTICAL FLY HEIGHT MEASUREMENT

BACKGROUND

It is often desirable to accurately measure the distance between two objects. It becomes increasingly difficult to measure the distance between two objects when the distance that separates the objects is small, e.g., nanoscale spacing between two objects. A specific example of such a distance that is difficult to measure is the "fly height" between a slider and a disc positioned adjacent thereto. Such slider/disc arrangements are commonly used, for example, in data storage systems. Increased storage density is becoming increasingly important and a reduced fly height allows information to be stored in a smaller area, i.e., at a higher areal density. As fly height dimensions continue to decrease to support increased storage densities, it is important to be able to accurately measure the fly height in order to ensure that the data storage system is operating as designed.

SUMMARY

An aspect of the invention is to provide a disc and a slider having an air bearing surface that is spaced apart from the disc. The slider includes a planar waveguide, a first diffraction grating for coupling an electromagnetic wave into the planar waveguide, wherein the first diffraction grating is positioned for directing the electromagnetic wave towards the air bearing surface of the slider. The slider also includes a second diffraction grating for receiving the electromagnetic wave reflected from the air bearing surface. The slider also includes a detector module to receive the electromagnetic wave from the second diffraction grating and a processor to determine the distance that the air bearing surface of the slider is spaced apart from the disc based on the detector module output.

Another aspect of the invention is to provide a fly height measurement system for measuring the fly height of a slider air bearing surface over a disc, wherein the system includes a light source for generating a light beam and an input grating coupler for receiving the light beam and directing the light beam toward the slider air bearing surface at an incident angle. The system also includes an output grating coupler for receiving the light beam reflected from the slider air bearing surface and means for determining the fly height based on the light beam received by the output grating coupler.

A further aspect of the invention is to provide a method for measuring the fly height of a slider air bearing surface over a disc, wherein the method includes providing a first diffraction grating for coupling an electromagnetic wave into a planar waveguide, directing the electromagnetic wave toward the slider air bearing surface, providing a second diffraction grating for receiving the electromagnetic wave reflected from the slider air bearing surface, and determining the fly height based on the electromagnetic wave received by the second diffraction grating.

These and various other features and advantages will be apparent from a reading of the following detailed description.

DRAWINGS

DETAILED DESCRIPTION

Figure 1:
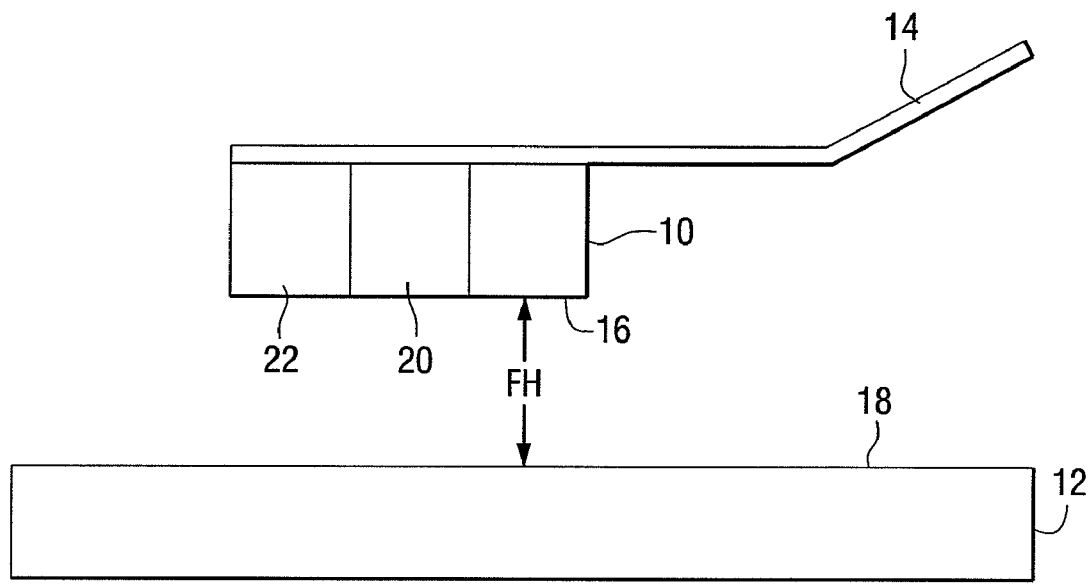
FIG. 1 illustrates a slider positioned adjacent to a disc, in accordance with an aspect of the invention.

FIG. 1 illustrates a slider 10 positioned adjacent to a disc 12, in accordance with an aspect of the invention. The slider 10 is schematically illustrated as mounted to a suspension support 14. The slider 10 includes an air bearing surface (ABS) 16 that is spaced apart from an upper surface 18 of the disc 12 by a distance referred to herein as the "fly height" (labeled as FH in FIG. 1). The disc 12 may be spinning in order to maintain the slider 10 at a particular fly height. The disc 12 may be, for example, a storage medium used in a data storage system. In addition, the slider 10 may be incorporated as part of a data storage system for performing read and/or write operations between a recording head portion 20 of the slider 10 and a disc 12 configured as a data storage medium. The recording head portion 20 and the disc 12 when configured as a data storage medium may be any type of data storage system such as, for example, a magnetic recording system, an optical recording system, a magneto-optical recording system, or a thermal assisted recording system.

Still referring to FIG. 1, the slider 10 includes a fly height measurement system 22, in accordance with an aspect of the invention. The fly height measurement system 22, as will be described in detail herein, could be utilized during the manufacturing process for forming the slider 10 and the disc 12 with the desired flying height dimension, or the fly height measurement system 22 could be utilized during operation of the slider 10 and disc 12 to maintain and monitor the flying height dimension during operation of a system that incorporates the slider 10 and disc 12.

Figure 2:
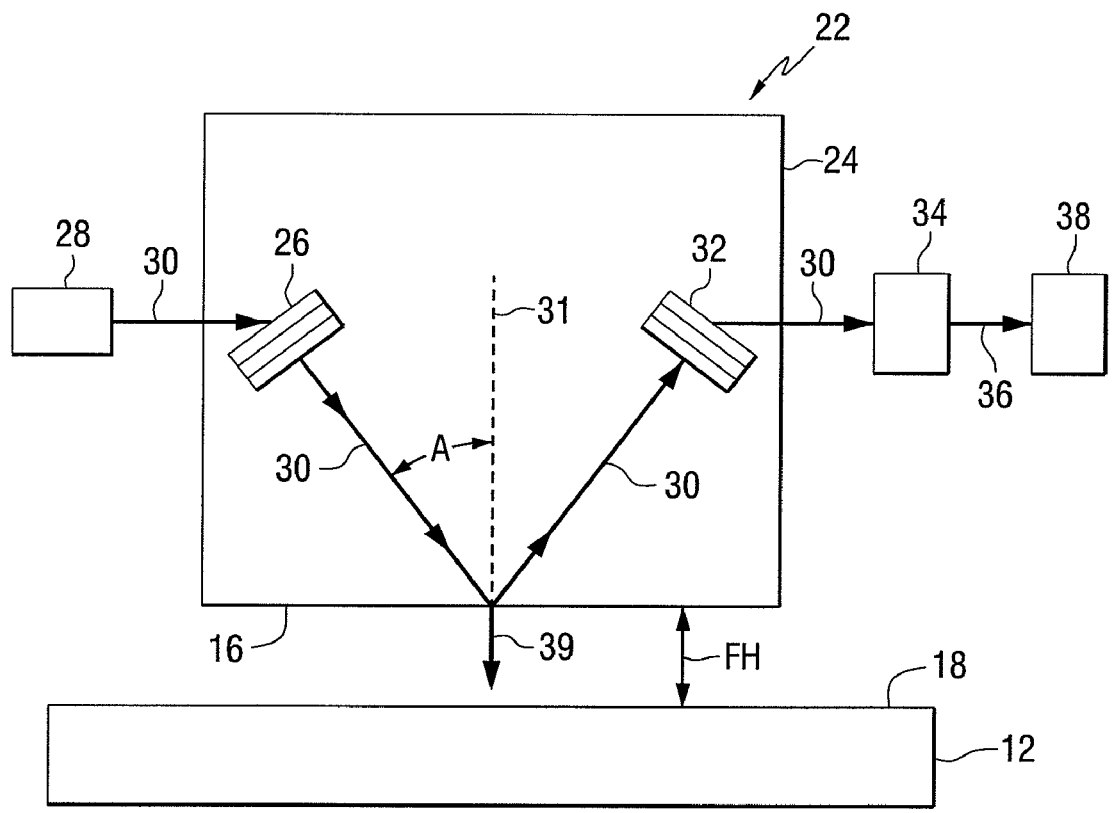
FIG. 2 is a schematic illustration of a fly height measurement system, in accordance with an aspect of the invention.

FIG. 2 is a schematic illustration of the fly height measurement system 22, in accordance with an aspect of the invention. The system 22 includes a planer waveguide 24 having a first diffraction grating 26 formed therein. A light source 28 directs a light beam 30 to the first diffraction grating 26 which, in turn, couples the light beam 30 into the planar waveguide 24. It will be appreciated that the planar waveguide 24 may be any type of waveguide arrangement suitable for propagating a light beam therethrough for the desired purpose. It will also be appreciated that the light source 28 may be any suitable type of light source such as, for example, a light emitting diode, a diode laser or a mercury arc lamp capable of producing the light beam 30 or any type of suitable electromagnetic wave for being coupled into the planar waveguide 24.

Still referring to FIG. 2, the first diffraction grating 26 serves as an input for launching the light beam 30 into the planar waveguide 24. The first diffraction grating 26 is positioned so as to direct the light beam 30 toward the ABS 16 of the planar waveguide 24, i.e., toward the ABS 16 of the slider 10. The light beam 30 is directed toward the ABS 16 at an incident angle A. The incident angle A may be, for example, in the range of about 40 degrees to about 80 degrees. The incident angle A is measured from a plane normal to the ABS 16 (as represented by dashed line 31) so as to have a sufficient angular direction to allow for the light beam 30 to reflect off of the ABS 16 and be directed towards a second diffraction grating 32. The second diffraction grating 32 serves as an output for directing the light beam 30 toward a detector module 34 for analyzing and determining the properties and characteristics of the light beam 30 that was reflected from the ABS 16 of the planar waveguide 24. The detector module 34 provides an output 36 to a processor 38 to process and determine the fly height distance FH between the ABS 16 and the upper surface 18 of the disc 12.

When the incident angle A is equal to or larger than the critical angle, $A_c$ (wherein $A_c = a \sin(1/n_{\mathit{eff}})$, where $n_{\mathit{eff}}$ is the effective refractive index of the waveguide 24), total internal reflection (TIR) occurs at the ABS 16 and substantially all of the light beam 30 is reflected off of the ABS 16 if the disc 12 is far away from the ABS 16. In addition, there will be an evanescent wave 39 generated below ABS 16 whose intensity exponentially decays away from the ABS 16. When the disc 12 is brought closer to ABS 16 at a distance less than the decay length of the evanescent wave 39, the evanescent wave 39 below the ABS 16 will interact with disc 12. As a result, some of the light beam 30 will be tunneled into the disc 12 (this is generally referred to as "Frustration of TIR") and the intensity of the reflected light beam 30 in the waveguide 24 will be reduced. The interaction strength between the evanescent wave 39 and the disc 12 is a function of the fly height FH between the ABS 16 and the upper surface 18 of the disc 12, and in turn the intensity of the reflected light beam 30 is a function of the fly height FH between the ABS 16 and the upper surface 18 of the disc 12. Therefore, the fly height FH can be determined by the measurement of the intensity of the reflected beam 30 or the reflectance (the ratio between the intensity of the reflected beam 30 and the intensity of the incident beam 30).

The detector module 34 may be, for example, a photo diode that collects the light beam 30 diffracted by the grating 32 and converts the light intensity signal to a current or voltage signal. Processor 38 receives the output signal 36 from the detector module 34 and normalizes the output signal 36 with the input signal, which is related to the intensity of the incident light beam 30 coming into the system 22 through the grating 26, to obtain a processed signal. The fly height FH can be determined from this processed signal by, for example, using a standard (obtained by modeling) or calibrated FH signal for an established measurement system. In this case, the standard or calibrated FH signal is a known function of the fly height FH.

Figure 3:
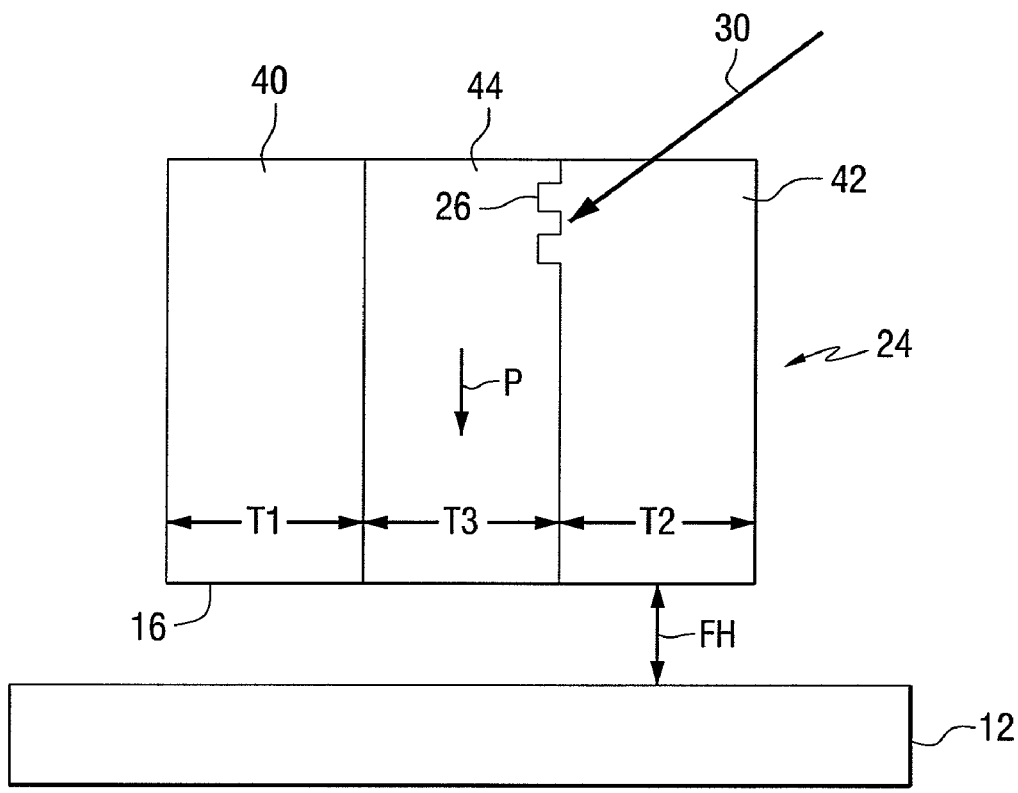
FIG. 3 illustrates a side view of a planar waveguide spaced apart from a disc by a fly height distance, in accordance with an aspect of the invention FIG. 4 graphically illustrates simulated results for reflectance versus fly height, in accordance with an aspect of the invention.

FIG. 3 illustrates a side view of the planar waveguide 24 spaced apart from the disc 12 by the fly height distance FH, in accordance with an aspect of the invention. The planar waveguide 24 may include a first cladding layer 40, a second cladding layer 42 and a core layer 44 positioned therebetween. The diffraction grating 26 is shown as formed in the core layer 44 for coupling the light beam 30 into the core layer 44 so as to allow the light beam to propagate in the direction indicated by arrow P toward the ABS 16. The first cladding layer 40 and second cladding layer 42 may be formed of, for example, $Al_2O_3$, $SiO_2$, SiN, or SiON. The first cladding layer 40 may have a thickness T1 in the range of about 400 nm to about 2000 nm and the second cladding layer 42 may have a thickness T2 in the range of about 400 nm to about 2000 nm. The core layer 44 may be formed of, for example, $Ta_2O_5$, $TiO_2$, Si, or SiC. The core layer 44 may have a thickness T3 in the range of about 50 nm to about 200 nm. The first cladding layer 40 and the second cladding layer 42 may have an index of refraction in the range of about 1.3 to about 1.8. The core layer 44 may have an index of refraction in the range of about 1.8 to about 4.0.

Figure 4:
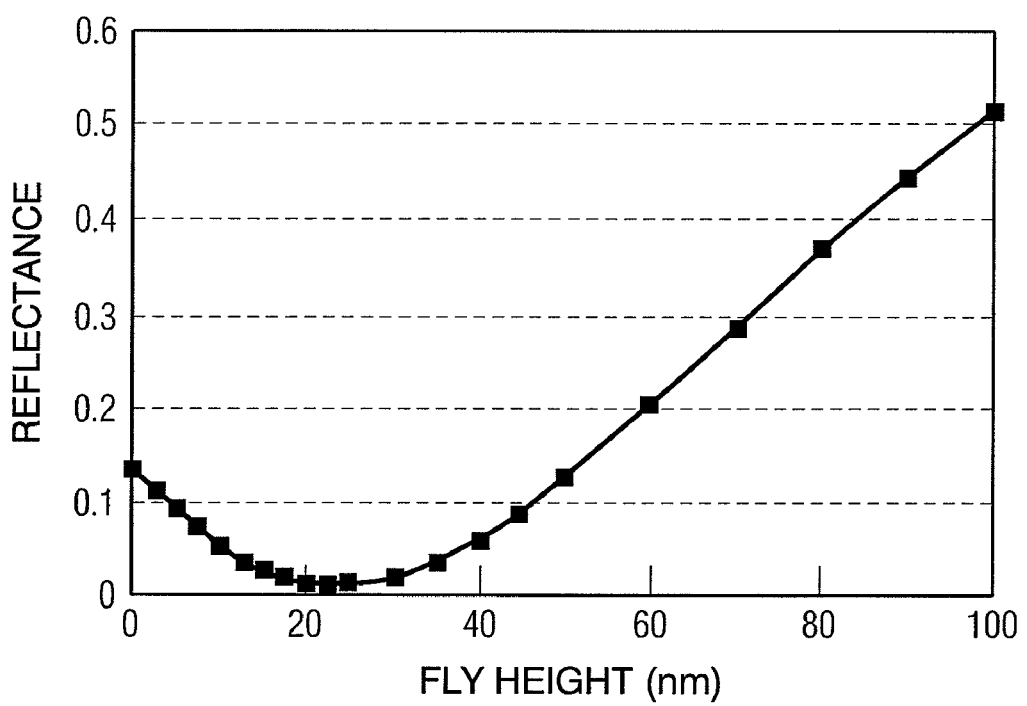

FIG. 4 graphically illustrates simulated results for reflectance versus fly height for the planar waveguide 24, in accordance with an aspect of the invention. The reflectance is the ratio of the light signal monitored from the output grating coupler 32 to the light signal on the input grating coupler 26. For this example, both the first cladding layer 40 and the second cladding layer 42 are semi-infinite layers formed of $Al_2O_3$ and having indices of refraction of 1.6. The core layer 44 is formed of $Ta_2O_5$ having a thickness of 80 nm and an index of refraction of 2.1. For a light beam 30 having a wavelength of 488 nm, the fundamental TE waveguide mode has a propagation constant of 1.7672. In this example, the disc 12 was simulated as a data storage medium having the following layers: a lubricant/overcoat layer adjacent the upper surface 18 of the disc 12 and being formed of carbon having a thickness of 2.5 nm and an index refraction of 1.3, a cobalt recording layer having a thickness of 15 nm, a thermal barrier layer formed of MgO having a thickness of 20 nm and an index of refraction of 2.0, and a heat sink layer formed of gold having a thickness of 250 nm. In addition, a 2.5 nm overcoat layer formed of a diamond like carbon material is assumed to be formed on the ABS 16 of the planar waveguide 24, i.e., formed on the ABS 16 of the slider 10, such that the assumed overcoat layer is adjacent the upper surface 18 of the disc 12 so as to define a fly height dimension therebetween. For this example, the incident angle A is 45 degrees, which is larger than the critical angle of 34.46 degrees for which TIR occurs at the n=1.7672/n=1.0 interface. As shown in FIG. 4, the reflectance increases as the flying height approaches 100 nm due to the TIR at the incident angle A of 45 degrees. The reflectance decreases as the flying height dimension decreases form 100 nm to about 20 nm as a result of frustration of TIR.

Still referring to FIG. 4, when the fly height becomes even smaller, e.g., less than about 20 nm, the reflectance starts to increase as the fly height gets smaller. This is the region where the evanescent field of the total internal reflection strongly interacts with the disc 12. As the disc 12 gets closer to the slider 10, more evanescent light reacts to the metallic material used in the simulation of the disc as a storage medium and gets reflected back by the disc 12. As shown, the reflectance is substantially linear to the fly height distance change in the range of about 0 nm to about 15 nm. This is the region where in, for example, a data storage system, the slider 10 may fly. Therefore, by measuring the reflectance, the fly height dimension FH can be measured.

Figure 5:
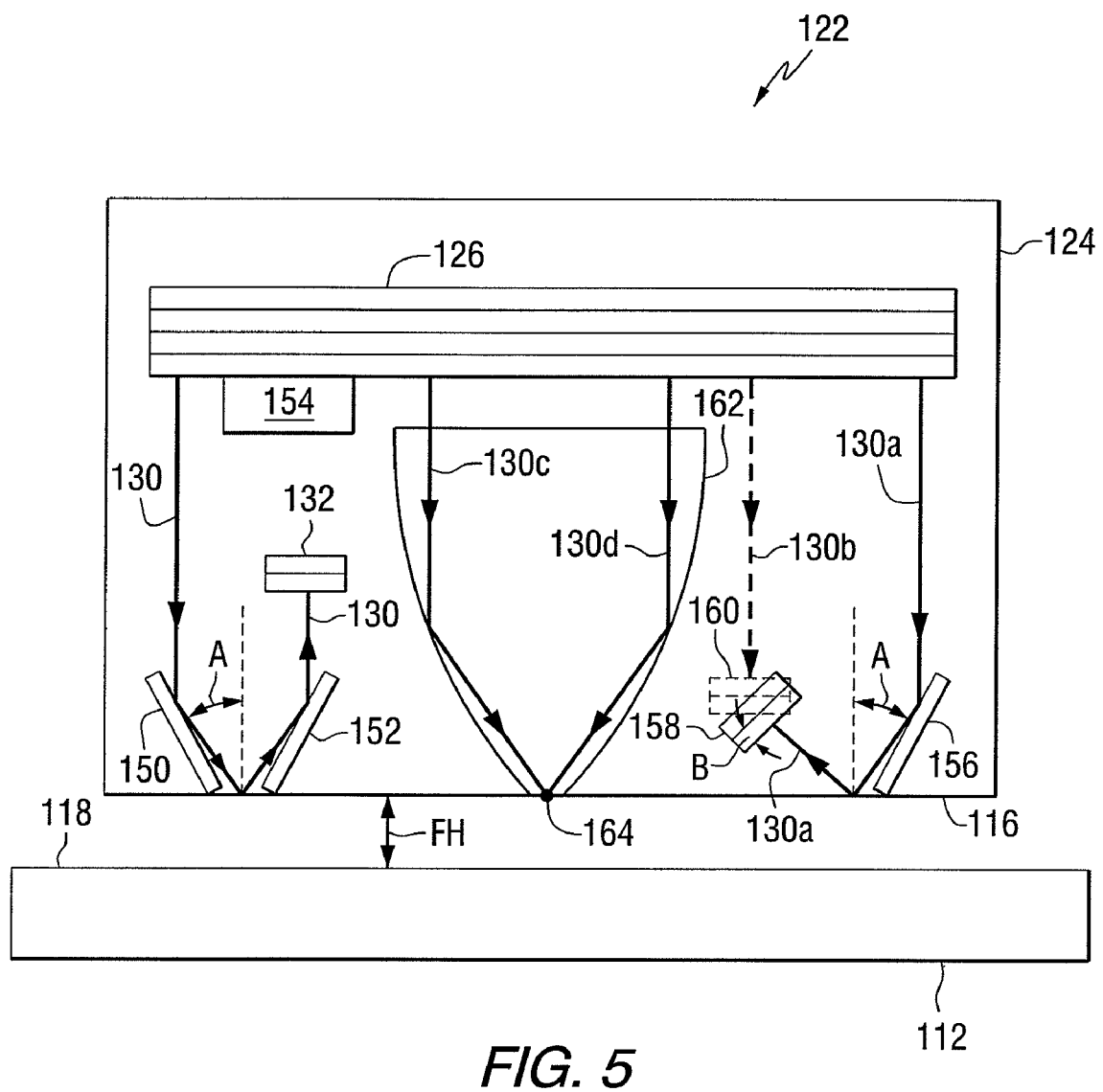
FIG. 5 is a schematic illustration of a fly height measurement system, in accordance with an aspect of the invention.

FIG. 5 is a schematic illustration of a fly height measurement system 122, in accordance with an aspect of the invention. The system 122 includes a planar waveguide 124 having a first diffraction grating 126 formed therein. The first diffraction grating 126 serves as an input for launching the light beam 130 into the planar waveguide 124. The first diffraction grating 126 is positioned to direct the light beam towards a reflective element or mirror 150. The mirror 150 is positioned so as to reflect the light beam 130 at an incident angle A towards the ABS 116 of the planar waveguide 124, i.e., toward the ABS 116 of the slider that incorporates the planar waveguide 124. The light beam 130 reflected off of the ABS 116 is directed towards an additional reflective element or mirror 152 that is positioned so as to direct the light beam 130 to a second diffraction grating 132. The fly height dimension FH between the ABS 116 and an upper surface 118 of the disc 112 can then be measured using the output from the second diffraction grating 132, as described in detail hereinabove. The mirrors 150 and 152 could be made of metals such as, for example, aluminum, silver, copper or gold. The mirrors 150 and 152 should be of sufficient thickness to extend substantially through the cladding layer 40, the core layer 44 and the cladding layer 42.

As shown in FIG. 5, a light blocker 154 maybe positioned between the first diffraction grating 126 and the second diffraction grating 132 to prevent any additional light beams from being directed toward the second diffraction grating 132 and interfering with the operation thereof. The light blocker 154 could be, for example, a mirror that reflects substantially the entire incident light beam. Alternatively, the light blocker 154 could be, for example, a light absorber that absorbs substantially all of the incident light beam rather than reflecting the light beam.

Still referring to FIG. 5, the system 122 may include an additional reflective element 156 for directing a light beam 130a at an incident angle A toward the ABS 116 for measuring the fly height dimension FH. The light beam 130a is reflected off of the ABS 116 and directed towards an output diffraction grating 158 for detection and processing of the light beam 130a to determine the fly height dimension FH.

FIG. 5 further illustrates that a light beam 130b (shown in dashed line) may be directed from the diffraction grating 126 toward an additional output diffraction grating 160 (shown in dashed line). The diffraction grating 158 and the diffraction grating 160 are at least partially overlapped and may be angularly offset at an angle B wherein angle B is in the range of about 0 degrees to about 90 degrees. The light that is then output from both the diffraction gratings 158 and 160 can be made to interfere and thereby further enhance the sensitivity of the fly height measurement. The grating 160 is structured and arranged to couple the light 130b out of the waveguide 124 at about the same angle that the grating 158 couples the light 130a out of the waveguide 124. Small differences in out-coupling angle are acceptable if a lens is used to capture this light and focus it onto a detector. The interference between the two beams coupled out of the waveguide 124 converts small differences in phase into intensity changes that can be measured by a detector using, for example, interferometric measurement techniques.

Again referring to FIG. 5, the planar waveguide 124 may also include a planar solid immersion mirror (PSIM) 162. The diffraction grating 126 may direct additional light beams 130c and 130d into the PSIM 162 such that the light beams are reflected to a predetermined point 164. Such an arrangement can be advantageous, for example, in a thermal assisted recording system where it is desirable to generate an optical spot of energy on the disc 112.

The implementation described above and other implementations are within the scope of the following claims.

What is claimed is:

1. A system, comprising:
    a disc; and
    a slider having an air bearing surface wherein the air bearing surface is spaced apart from said disc, said slider including:
        a planar waveguide;
        a first diffraction grating for coupling an electromagnetic wave into said planar waveguide, said first diffraction grating positioned for directing the electromagnetic wave towards said air bearing surface;
        a second diffraction grating spaced apart from said first diffraction grating for receiving the electromagnetic wave reflected from said air bearing surface;
        a detector module to receive the electromagnetic wave from the second diffraction grating; and
        a processor to determine the distance the air bearing surface of said slider is spaced apart from said disc based on an output of the detector module.

2. The system of claim 1, further including a reflective element positioned between said first diffraction grating and said air bearing surface of said slider.

3. The system of claim 2, wherein said reflective element directs said electromagnetic wave towards said air bearing surface at an incident angle in the range of about 40 degrees to about 80 degrees.

4. The system of claim 1, further including a reflective element positioned between said air bearing surface of said slider and said second diffraction grating.

5. The system of claim 1, wherein said first diffraction grating directs said electromagnetic wave towards said air bearing surface of said slider at an incident angle in the range of about 40 degrees to about 80 degrees.

6. The system of claim 1, wherein said disc is a data storage media.

7. The system of claim 1 wherein said slider further includes means for performing data storage read or write operations.

8. The system of claim 1, wherein the planar waveguide includes a planar solid immersion mirror.

9. The system of claim 8, wherein the first diffraction grating is positioned to direct an additional electromagnetic wave into said planar solid immersion mirror for focusing the additional electromagnetic wave to a predetermined point.

10. The system of claim 1, wherein the first diffraction grating is positioned to direct an additional electromagnetic wave to a third diffraction grating wherein the third diffraction grating at least partially overlaps said second diffraction grating.

* * * * *